United States Patent
Leppanen et al.

(10) Patent No.: US 9,959,768 B2
(45) Date of Patent: May 1, 2018

(54) APPARATUSES, METHODS AND COMPUTER PROGRAMS FOR CONTROLLING ROAD USER ACKNOWLEDGEMENT

(71) Applicant: Nokia Technologies Oy, Espoo (FI)

(72) Inventors: Jussi Leppanen, Tampere (FI); Arto Lehtiniemi, Lempaala (FI); Pasi Saari, Jyvaskyla (FI); Erika Reponen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 15/507,358

(22) PCT Filed: Sep. 2, 2015

(86) PCT No.: PCT/FI2015/050572
§ 371 (c)(1),
(2) Date: Feb. 28, 2017

(87) PCT Pub. No.: WO2016/034771
PCT Pub. Date: Mar. 10, 2016

(65) Prior Publication Data
US 2017/0243490 A1 Aug. 24, 2017

(30) Foreign Application Priority Data
Sep. 4, 2014 (EP) .................................. 14183622

(51) Int. Cl.
*G08G 1/16* (2006.01)
*B60K 35/00* (2006.01)
*G05D 1/00* (2006.01)

(52) U.S. Cl.
CPC ............. *G08G 1/166* (2013.01); *B60K 35/00* (2013.01); *B60K 2350/2052* (2013.01); *B60K 2350/2065* (2013.01); *B60K 2350/2095* (2013.01); *B60K 2350/921* (2013.01); *G05D 1/0088* (2013.01)

(58) Field of Classification Search
CPC ................................. G08G 1/166; B60K 35/00
See application file for complete search history.

(56) References Cited

U.S. PATENT DOCUMENTS

| | | | | |
|---|---|---|---|---|
| 2006/0235597 A1* | 10/2006 | Hori | .................. | B60Q 1/50 701/96 |
| 2011/0140919 A1* | 6/2011 | Hara | ...................... | B60Q 1/50 340/907 |
| 2015/0229885 A1* | 8/2015 | Offenhaeuser | ........ | B60W 30/09 348/78 |
| 2015/0336502 A1* | 11/2015 | Hillis | ...................... | B60Q 1/26 701/23 |

FOREIGN PATENT DOCUMENTS

EP 1 699 033 A2 9/2006
EP 2 333 742 A1 6/2011

OTHER PUBLICATIONS

Braun, Peter, "How Google's Self-Driving Cars Avoid Plowing into Cyclists", Apr. 28, 2014, www.digitaltrends.com, 2 pgs.
Fingas, Jon, "Toyota's LED-lit Concept Car Lets Your Kids Customize the Hood", Jun. 14, 2014, www.engadget.com, 2 pgs.

* cited by examiner

Primary Examiner — Leon Flores
(74) Attorney, Agent, or Firm — Harrington & Smith

(57) ABSTRACT

Apparatuses, computer programs and methods are provided. A method includes causing display on an autonomous or semi-autonomous vehicle of a dynamic sign acknowledging the presence of at least one road user.

20 Claims, 8 Drawing Sheets

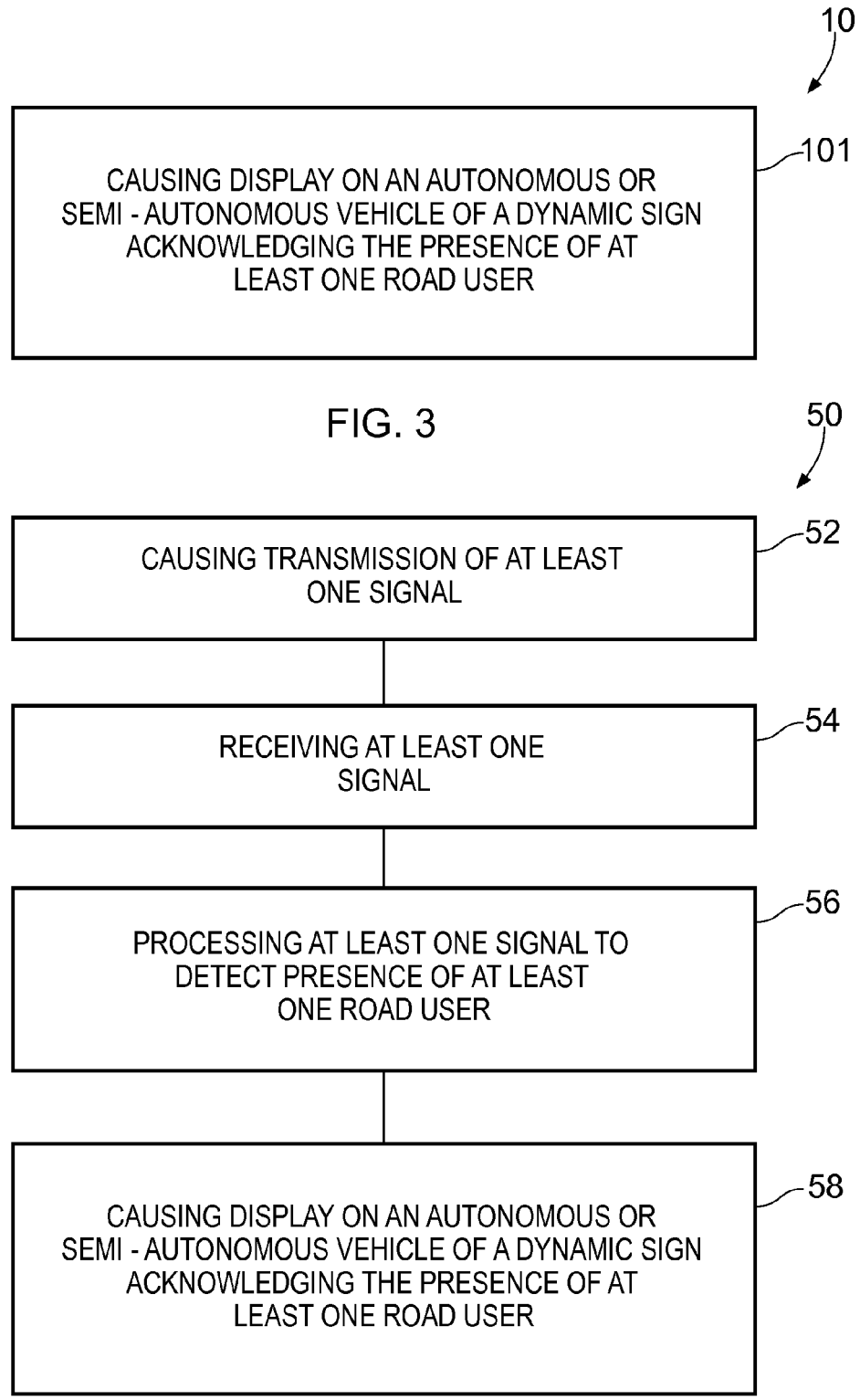

Figure 1:
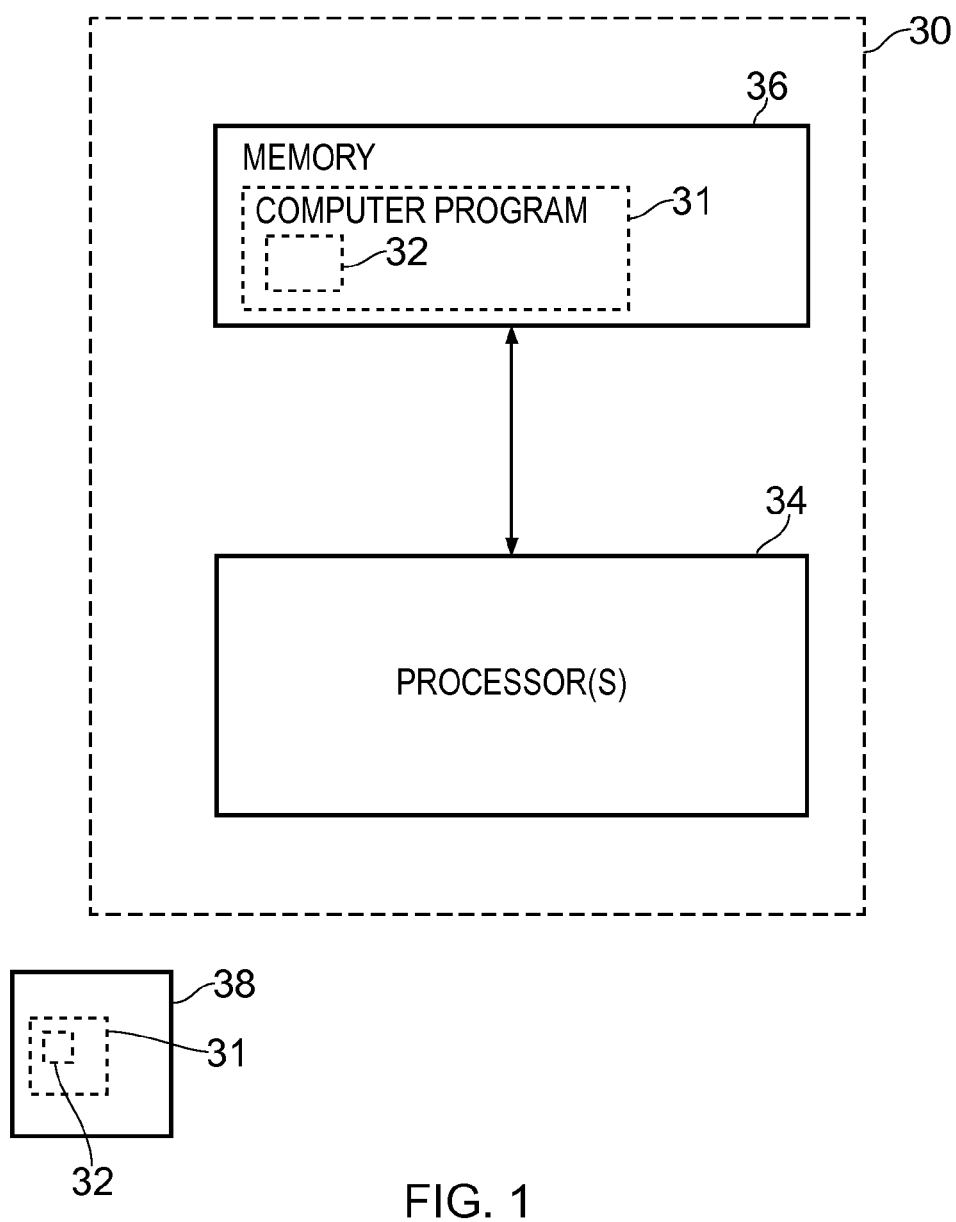

APPARATUSES, METHODS AND COMPUTER PROGRAMS FOR CONTROLLING ROAD USER ACKNOWLEDGEMENT

TECHNOLOGICAL FIELD

Examples of the disclosure relate to controlling road user acknowledgement.

BACKGROUND

Autonomous and semi-autonomous vehicles are configured for unmanned operation. That is, autonomous and semi-autonomous vehicles are configured to move from one location to another, without a human driver positioned in the vehicle. One or more humans may be positioned in the vehicle but may not be providing driving input, such as controlling steering, braking acceleration and so on.

An autonomous vehicle is a vehicle that is configured to navigate, steer, accelerate and decelerate autonomously (without any human driver being positioned in or outside the vehicle that is operating the vehicle).

A semi-autonomous vehicle is a vehicle that is configured to navigate, steer, accelerate and/or decelerate, without any human driver being present in the vehicle that is operating the vehicle, in response to instructions received from a remote location (for example, wirelessly). An autonomous vehicle might be operated semi-autonomously, for instance, if it no longer becomes possible for the vehicle to operate autonomously for some reason.

A semi-autonomous vehicle may also be a vehicle that is driven by a human in the vehicle but may take control of itself for the purpose of safety or convenience. For example, the vehicle may control itself to automatically park and so on.

BRIEF SUMMARY

According to various, but not necessarily all, examples of the disclosure there is provided a method comprising: causing display on an autonomous or semi-autonomous vehicle of a dynamic sign acknowledging the presence of at least one road user.

According to various, but not necessarily all, examples of the disclosure there is provided an apparatus comprising means for causing display on an autonomous or semi-autonomous vehicle of a dynamic sign acknowledging the presence of at least one road user.

According to various, but not necessarily all, examples of the disclosure there is provided computer program code, that when performed by at least one processor, causes at least the following to be performed: causing display on an autonomous or semi-autonomous vehicle of a dynamic sign acknowledging the presence of at least one road user.

The computer program code may be stored on a non-transitory computer readable medium.

According to various, but not necessarily all, examples of the disclosure there is provided an apparatus comprising: at least one processor; and at least one memory including computer program code, the at least one memory and the computer program code configured to, with the at least one processor, cause at least the following to be performed: displaying on an autonomous or semi-autonomous vehicle a dynamic sign acknowledging the presence of at least one road user.

According to various, but not necessarily all, examples of the disclosure there is provided examples as claimed in the appended claims.

BRIEF DESCRIPTION

Figure 2:
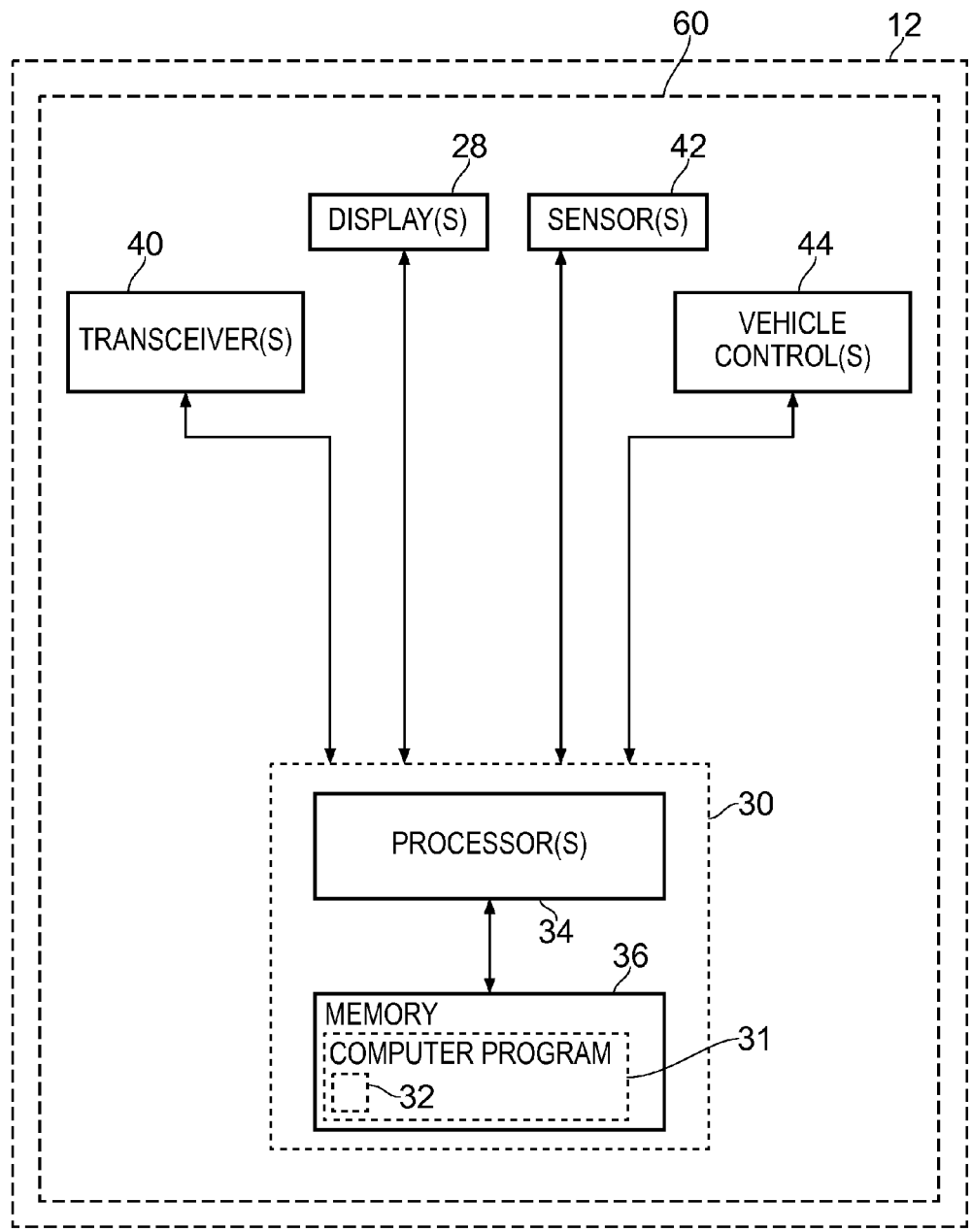
Figure 5A:
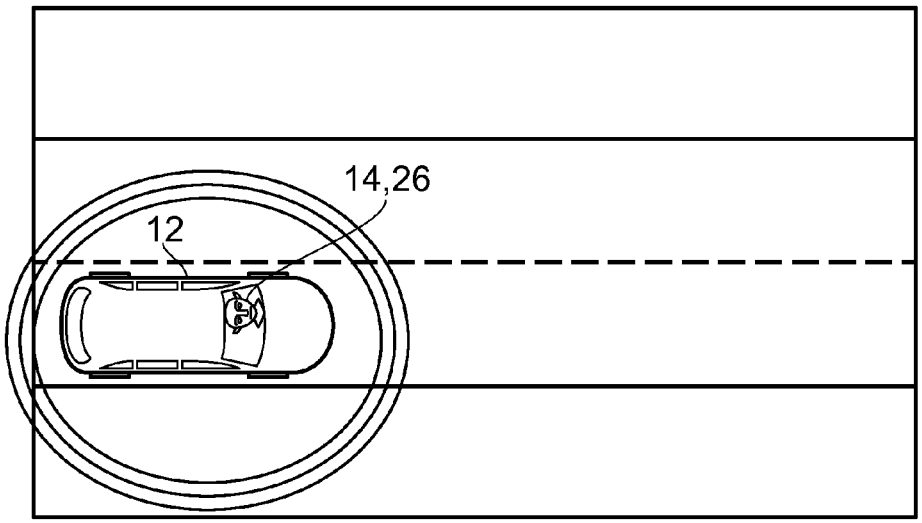
Figure 5B:
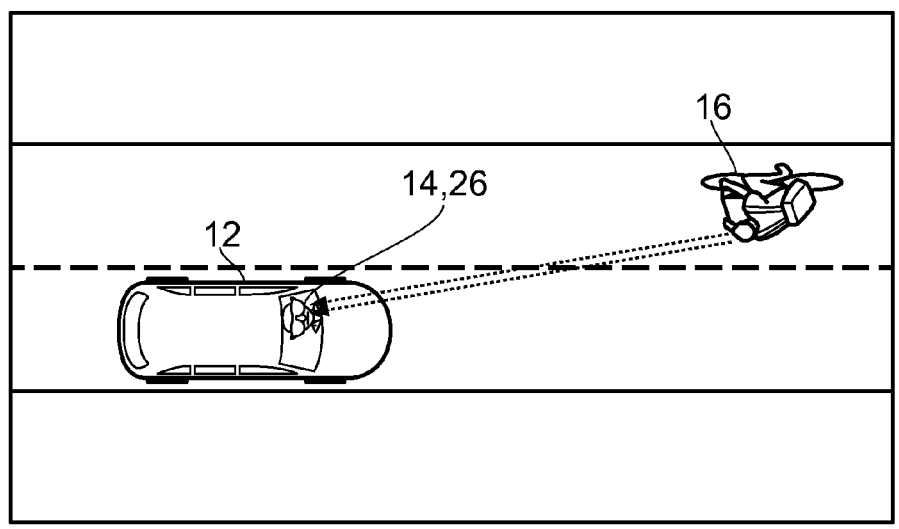
Figure 6:
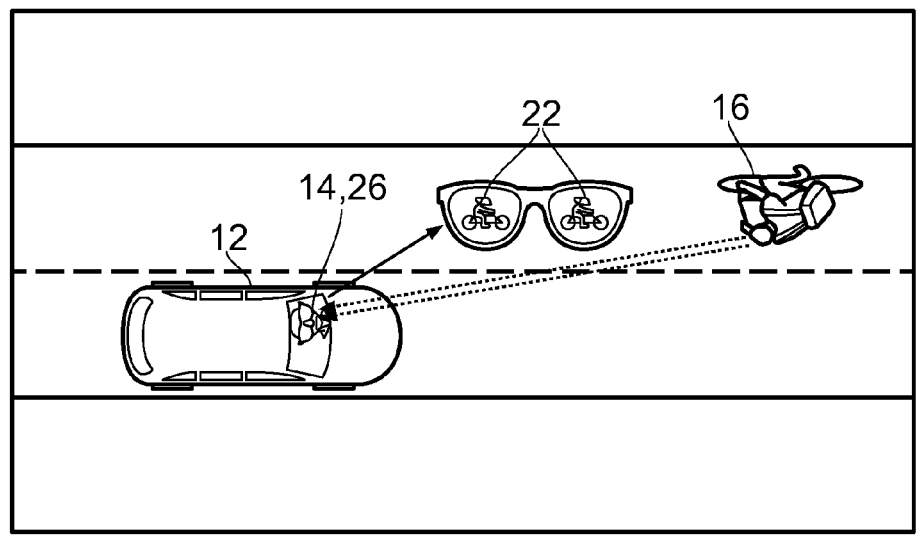
Figure 7:
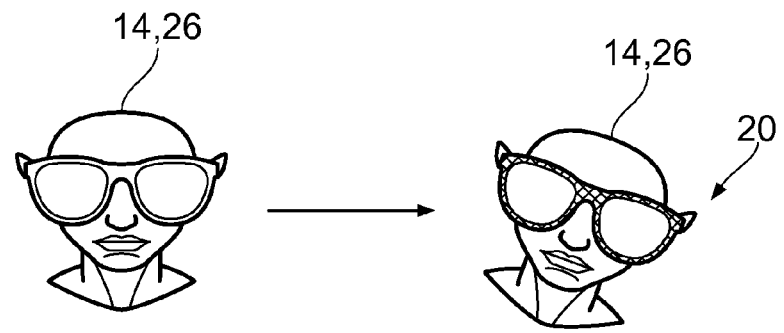
Figure 8A:
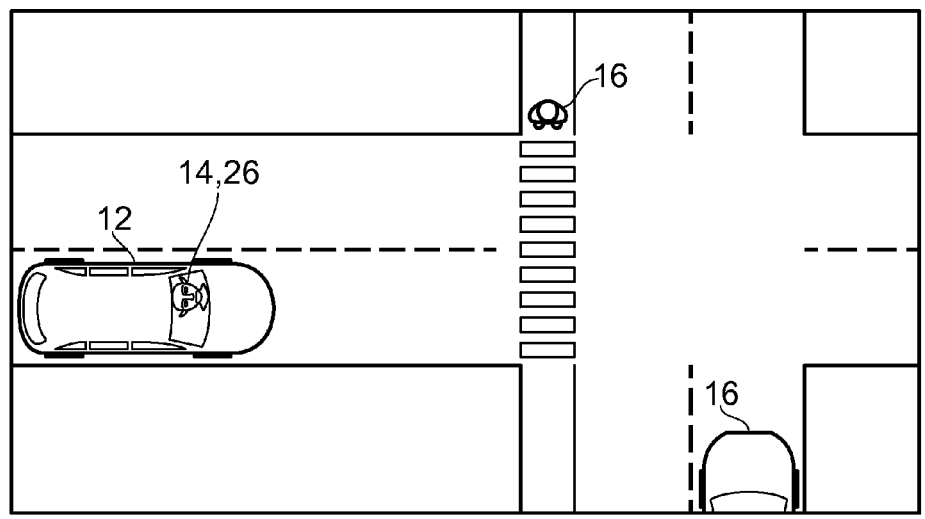
Figure 8B:
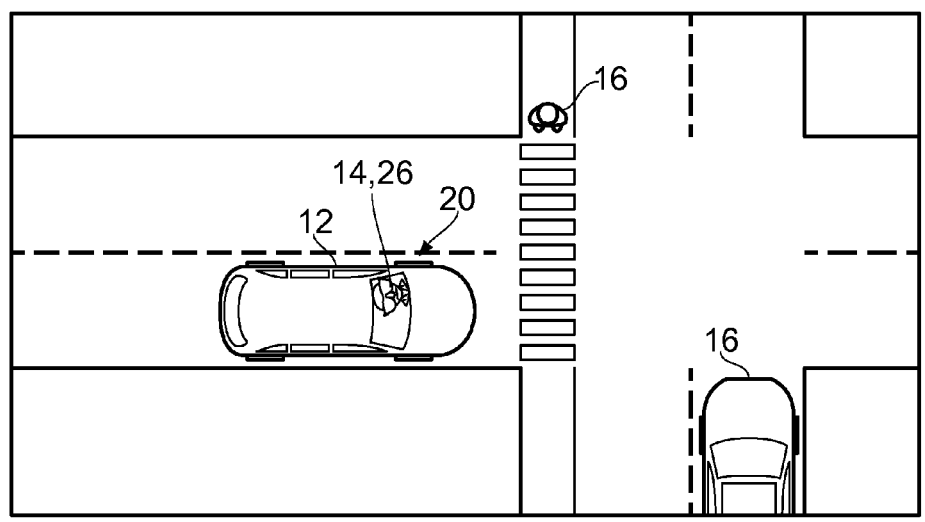
Figure 8C:
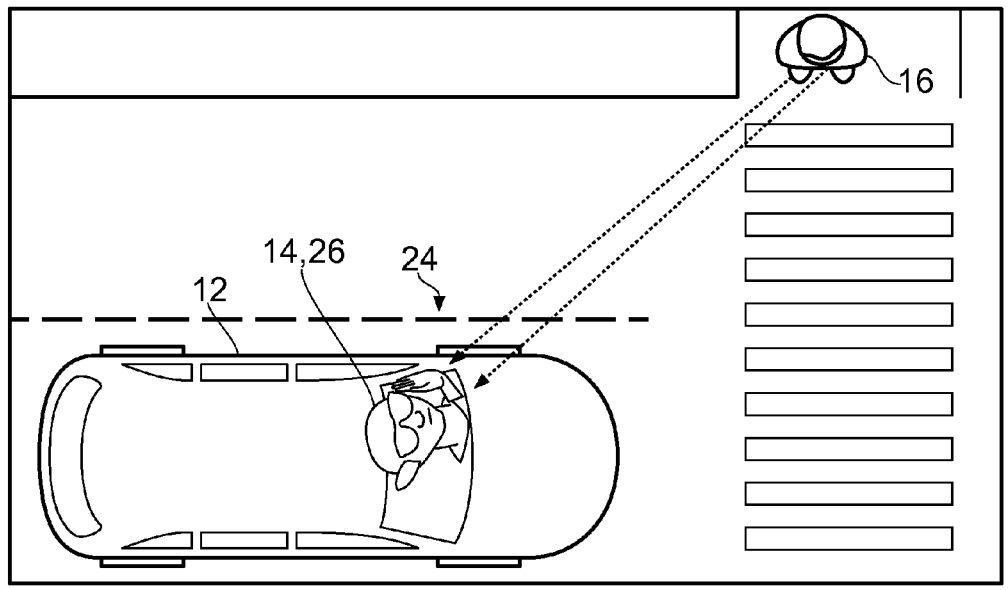
Figure 8D:
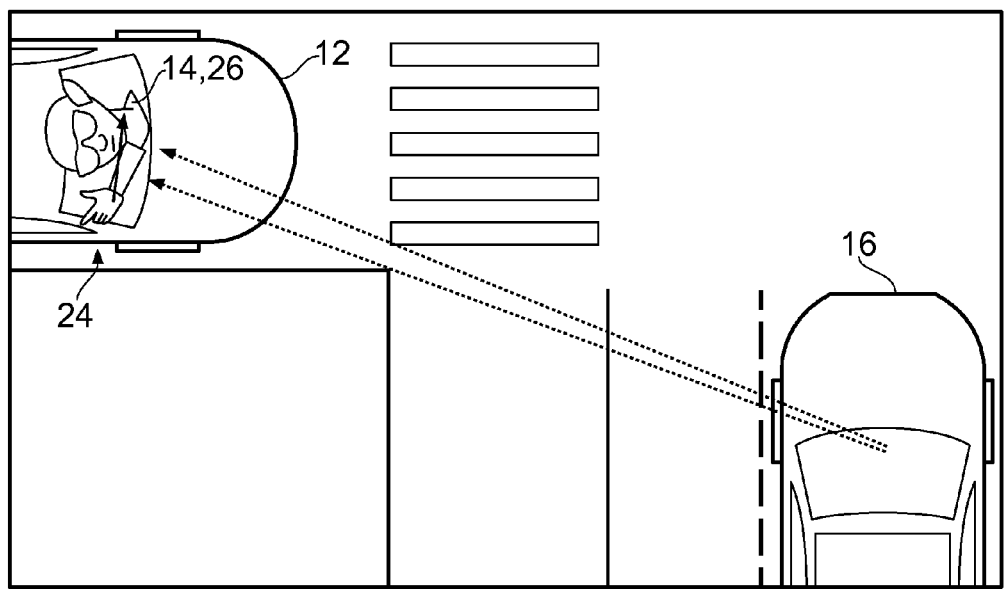
Figure 9:
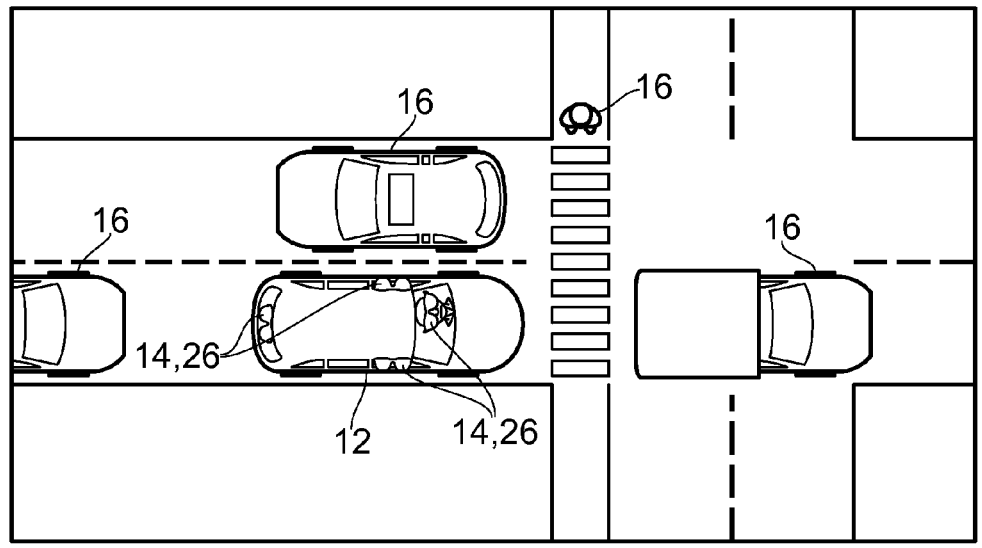
Figure 10:
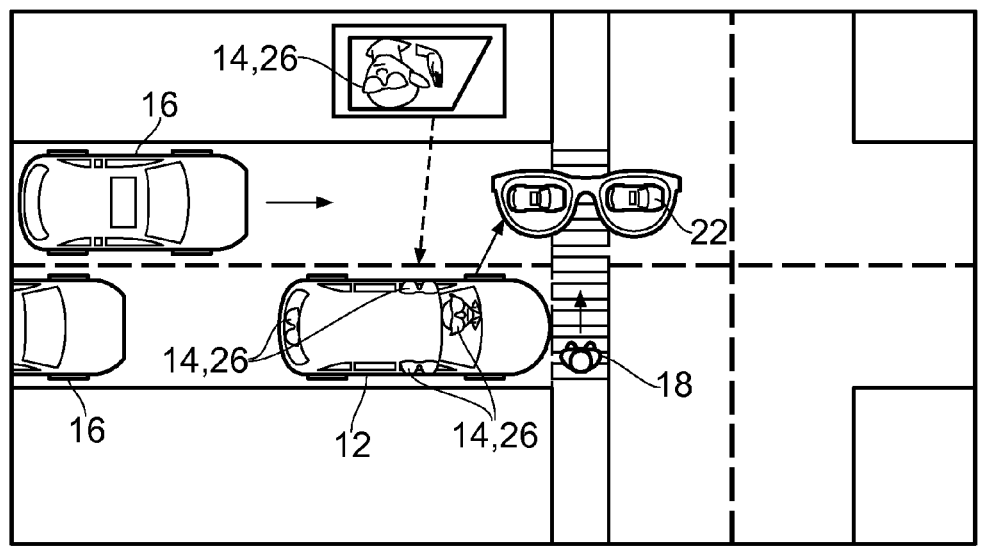

For a better understanding of various examples that are useful for understanding the detailed description, reference will now be made by way of example only to the accompanying drawings in which:

FIG. 1 illustrates an example of an apparatus;
FIG. 2 illustrates an example of an apparatus;
FIG. 3 illustrates an example of a method;
FIG. 4 illustrates an example of a method;
FIG. 5A illustrates an example of operation of an autonomous or semi-autonomous vehicle;
FIG. 5B illustrates an example of operation of an autonomous or semi-autonomous vehicle;
FIG. 6 illustrates an example of operation of an autonomous or semi-autonomous vehicle;
FIG. 7 illustrates an example of operation of a dynamic sign;
FIG. 8A illustrates an example of operation of an autonomous or semi-autonomous vehicle;
FIG. 8B illustrates an example of operation of an autonomous or semi-autonomous vehicle;
FIG. 8C illustrates an example of operation of an autonomous or semi-autonomous vehicle;
FIG. 8D illustrates an example of operation of an autonomous or semi-autonomous vehicle;
FIG. 9 illustrates an example of operation of an autonomous or semi-autonomous vehicle; and
FIG. 10 illustrates an example of operation of an autonomous or semi-autonomous vehicle.

DETAILED DESCRIPTION

Examples of the disclosure relate to autonomous or semi-autonomous vehicles and their interaction with one or more other road users. In examples, an autonomous or semi-autonomous vehicle may display a dynamic sign, such as an avatar, to communicate information to other road users such as pedestrians, cyclists and human-driven vehicles.

For example, the dynamic sign displayed by an autonomous or semi-autonomous vehicle may acknowledge the presence of at least one road user.

The dynamic sign is configured to inform other road users as to whether the autonomous or semi-autonomous vehicle has detected their presence providing greater certainty to the other road users.

A technical effect of at least some examples of the disclosure is that human road users know that they have been detected by an autonomous or semi-autonomous vehicle.

Another technical effect of at least some examples of the disclosure is that they provide for safer operation of an autonomous or semi-autonomous vehicle.

FIG. 3 illustrates a method 10 comprising causing display on an autonomous or semi-autonomous vehicle 12 of a dynamic sign 14 acknowledging the presence of at least one road user 16.

FIGS. 1 and 2 illustrate an apparatus 30 comprising means for causing display on an autonomous or semi-autonomous vehicle 12 of a dynamic sign 14 acknowledging the presence of at least one road user 16.

FIG. 1 illustrates an example of an apparatus 30 that may be a chip or a chip set. The apparatus 30 may form part of a vehicle control system 60 comprised in an autonomous or semi-autonomous vehicle 12 such as the one illustrated in the example of FIG. 2.

Implementation of the apparatus 30 may be as controller circuitry. The apparatus 30 may be implemented in hardware alone, have certain aspects in software including firmware alone or can be a combination of hardware and software (including firmware).

As illustrated in FIG. 1 the apparatus 30 may be implemented using instructions that enable hardware functionality. For example, the apparatus 30 may be implemented using executable computer program instructions 31 in a general-purpose or special-purpose processor 34. The executable computer program instructions 31 may be stored on a computer readable storage medium (disk, memory etc) to be executed by such a processor 34.

The processor 34 is configured to read from and write to the memory 36. The processor 34 may also comprise an output interface via which data and/or commands are output by the processor 34 and an input interface via which data and/or commands are input to the processor 34.

The processor 34 provides means for accessing information in the memory 36 and for executing computer program code 32 stored in the memory 36.

The memory 36 stores a computer program 31 comprising computer program instructions (computer program code 32) that controls the operation of the apparatus 30 when loaded into the processor 34. The computer program instructions, of the computer program 31, provide the logic and routines that enables the apparatus to perform the methods illustrated in FIGS. 3 and 4. The processor 34 by reading the memory 36 is able to load and execute the computer program 31.

The apparatus 30 therefore comprises:
at least one processor 34; and
at least one memory 36 including computer program code 32
the at least one memory 36 and the computer program code 32 configured to, with the at least one processor 34, cause the apparatus 30 at least to perform:
causing display on an autonomous or semi-autonomous vehicle of a dynamic sign acknowledging the presence of at least one road user.

As illustrated in FIG. 1, the computer program 31 may arrive at the apparatus 30 via any suitable delivery mechanism 38. The delivery mechanism 38 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 31. The delivery mechanism may be a signal configured to reliably transfer the computer program 31. The apparatus 30 may propagate or transmit the computer program 31 as a computer data signal.

Although the memory 36 is illustrated as a single component/circuitry it may be implemented as one or more separate components/circuitry some or all of which may be integrated/removable and/or may provide permanent/semi-permanent/dynamic/cached storage.

Although the processor 34 is illustrated as a single component/circuitry it may be implemented as one or more separate components/circuitry some or all of which may be integrated/removable. The processor 34 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 illustrates an example of an apparatus 60. In the illustrated example the apparatus 60 is a vehicle control system for an autonomous or semi-autonomous vehicle 12. The apparatus 60 may be comprised in an autonomous or semi-autonomous vehicle 12.

In the example of FIG. 2, the apparatus 60 comprises one or more transceivers 40, one or more displays 28, one or more sensors 42, one or more vehicle controls 44 and the apparatus 30 illustrated in FIG. 1.

As illustrated in the example of FIG. 2, the elements 40, 28, 42 and 44 are operationally coupled to the apparatus 30 and any number or combination of intervening elements can exist between them (including no intervening elements).

In other examples, the elements 40, 28, 42 and 44 may be operationally coupled to each other.

The transceivers 40 may comprise one or more radio transceivers 40. The one or more radio frequency transceivers 40 are configured to transmit and receive radio frequency signals. For example, the one or more radio frequency transceivers 40 may be compatible with one or more short range radio protocols, such as Bluetooth or WiFi protocols. Alternatively or additionally, the one or more radio frequency transceivers may be compatible with one or more longer range radio protocols, such as one or more cellular telephone protocols.

The processor 34 is configured to control the one or more radio frequency transceivers 40 to transmit radio frequency signals comprising data. The processor 34 is also configured to receive inputs from the one or more radio frequency transceivers 40 in the form of data comprised in received radio frequency signals.

For example, the one or more radio frequency transceivers 40 may be configured to receive from one or more road users signals that may be processed by the processor 34 to detect the presence of the one or more road users 16. See, for example, FIGS. 5A to 10.

The one or more transceivers provide means for transmitting and/or receiving signal(s) comprising data.

The one or more sensors 42 are configured to obtain information to allow the autonomous or semi-autonomous vehicle 12 to operate without a human driver within the vehicle controlling driving functions of the autonomous or semi-autonomous vehicle 12. For example, one or more humans may be within the autonomous or semi-autonomous vehicle 12 but the autonomous or semi-autonomous vehicle 12 may control itself or be controlled without input from the one or more humans within the autonomous or semi-autonomous vehicle 12.

The one or more sensors 42 may be configured to obtain information to allow the autonomous or semi-autonomous vehicle 12 to perform safety-critical driving functions and/or monitor roadway conditions. For example, the one or more sensors 42 may obtain information to allow detection of one or more objects, such as other road users 16. Additionally or alternatively the one or more sensors 42 may be configured to obtain information to determine the route the autonomous or semi-autonomous vehicle 12 should navigate, for example the one or more sensors 42 may be configured to obtain information to allow the autonomous or semi-autonomous vehicle 12 to follow the course of the road that the autonomous or semi-autonomous vehicle 12 is driving along.

In some examples the one or more sensors 42 may be configured to scan the environment of the autonomous or semi-autonomous vehicle 12 to create a three-dimensional map of the environment to allow the autonomous or semi-autonomous vehicle 12 to navigate through the environment.

The one or more sensors 42 may comprise any suitable sensors. For example, the one or more sensors 42 may comprise one or more cameras and/or one or more microwave sensors and/or one or more infrared sensors and/or one or more LIDAR sensors. The one or more sensors 42 may be configured to transmit a signal such as a laser and/or microwave and/or infrared signal and detect the response signal returned by the environment.

The one or more sensors 42 may be configured to receive signals comprising data to allow detection of the presence of other road users 16.

The one or more sensors 42 provide means for transmitting and/or receiving signals comprising data.

Additionally or alternatively the one or more radio frequency transceivers 40 may be configured to receive signals comprising data to allow detection of the presence of other road users 16.

For example, the apparatus 60 may be configured to connect to a network of devices that transmit the location and other navigational information of other road users 16 to the autonomous or semi-autonomous vehicle 12. The one or more radio frequency transceivers 40 and/or the one or more sensors 42 may be configured to receive this information.

In some examples, the one or more radio frequency transceivers 40 and/or the one or more sensors 42 may be configured to receive signals comprising data identifying the locations of other road user(s) that are locally shared over a proximity radio network.

The one or more radio frequency transceivers 40 and/or the one or more sensors may be configured to receive signals comprising data from apparatuses or devices of other road users. For example, other road users may be equipped with cameras and/or mobile devices and/or wearable devices and/or sensors that can detect the autonomous or semi-autonomous vehicle 12 and provide a notification to the autonomous or semi-autonomous vehicle 12 to inform the autonomous or semi-autonomous vehicle 12 of the presence of the other road user or users.

The processor 34 is configured to control operation of the one or more sensors 42. For example, the processor 34 may be configured to control the one or more sensors to transmit and/or receive signals comprising data.

The processor 34 is also configured to process received signals from the one or more radio frequency transceivers 40 and/or the one or more sensors 42 to allow the autonomous or semi-autonomous vehicle 12 to determine its environment and detect one or more other road users. The processor 34 may also process received signals from the one or more radio frequency transceivers 40 and/or the one or more sensors 42 to compute possible next actions of other road users 16.

The one or more displays 28 are configured to display a dynamic sign 14 such as a dynamic sign acknowledging the presence of at least one road user 16.

The one or more displays 28 may be any suitable display, for example a semi-transparent display 28 attached at an appropriate point on an autonomous or semi-autonomous vehicle 12 such as the front screen. In other examples, a projector may be used instead of a semi-transparent display to display the dynamic sign 14.

In some examples the one or more displays 28 may comprise an arrangement of light emitting diodes (LEDs).

In some examples, the one or more displays 28 may be autostereoscopic displays that display different information to different view angles.

In general the one or more displays 28 may be the same type of display or any combination of different types of display.

The dynamic sign 14 is externally projected. That is, the dynamic sign 14 is visible from outside the autonomous or semi-autonomous vehicle 12. In some examples, the dynamic sign 14 may also be visible from inside the autonomous or semi-autonomous vehicle 12.

The one or more displays 28 provide means for displaying the dynamic sign 14.

The processor 34 is configured to control the one or more displays 28. For example, the processor 34 is configured to cause the one or more displays 28 to display a dynamic sign 14 acknowledging the presence of at least one road user 16.

In some examples, the processor 34 may be configured to control multiple displays 28 independently of each other.

The processor 34 is configured to control operation of the one or more displays 28 in response to information received from the one or more sensors 42 and/or one or more radio frequency transceivers 40. For example, the processor 34 may be configured to control display on the one or more displays 28 of a dynamic sign acknowledging the presence of at least one road user 16 in response to signals received by the one or more sensors 42 and/or the one or more radio frequency transceivers 40.

The one or more vehicle controls 44 are configured to control one or more driving functions of the autonomous or semi-autonomous vehicle 12. For example, the one or more vehicle controls 44 may be configured to control steering, acceleration, braking and/or gear changes and so on of the autonomous or semi-autonomous vehicle 12.

The processor 34 is configured to control operation of the one or more vehicle controls 44. In some examples, the processor 34 may be configured to control operation of the one or more vehicle controls in response to information received from the one or more sensors 42 and/or one or more radio frequency transceivers 40.

In some examples, the apparatus 60 may comprise any number of additional elements. In some examples, the apparatus 60 may not comprise one or more elements illustrated in the example of FIG. 2. For example, the apparatus 60 may, in some examples, not comprise the one or more radio frequency transceivers 40 and/or the one or more vehicle controls 44.

The processor 34 provides means for controlling operation of the apparatus 60.

FIG. 3 illustrates an example of a method 10. The method 10 may be performed by the apparatus 30 of FIG. 1 or the apparatus 60 of FIG. 2.

At block 101 display on an autonomous or semi-autonomous vehicle 12 of a dynamic sign 14 acknowledging the presence of at least one road user 16 is caused.

Various examples of the disclosure will be described below in relation to FIGS. 4 to 10.

FIG. 4 illustrates an example of another method 50. The method 50 may be performed by the apparatus 30 of FIG. 1 or the apparatus 60 of FIG. 2.

At block 52 transmission of at least one signal is caused. For example, the at least one signal may be transmitted by the one or more radio frequency transceivers 40 and/or one or more sensors 42. The transmission of the at least one signal may be to try to detect any road users in the vicinity of the autonomous or semi-autonomous vehicle 12.

At block 54 at least one signal is received. For example, the at least one signal may be received by the one or more radio frequency transceivers 40 and/or one or more sensors 42. The received signal may be received in response to the transmitted signal and/or may be a reflection of the transmitted signal. For example, the received signal may be a reflected laser signal transmitted by the one or more sensors 42

In other examples the received signal may be a radio frequency signal received from a device in the vicinity of the autonomous or semi-autonomous vehicle 12.

At block 56 at least one signal to detect the presence of at least one road user is processed. For example, the received at least one signal may be processed to detect the presence of at least one road user.

In some examples, the received at least one signal may include data indicating the presence of at least one road user 16. For example, the at least one signal may comprise data including the location and velocity of at least one road user.

Additionally or alternatively, the at least one signal may be processed in combination with data of when one or more signals were transmitted to detect the presence of at least one road user 16.

In general, any suitable method for detecting the presence of at least one road user using received signals may be used.

At block 58 display on an autonomous or semi-autonomous vehicle 12 of a dynamic sign acknowledging the presence of at least one road user 16 is caused. The dynamic sign 14 may comprise visual data that is modified in dependence upon data representing at least one road user 16. For example, the dynamic sign 14 may be modified in response to a received signal comprising data representative of at least one road user 16, such as the at least one signal received at block 54 and processed at block 56.

The dynamic sign 14 may be displayed on the one or more displays 28. The dynamic sign 14 may be any suitable sign that acknowledges the presence of at least one road user 16. For example, the appearance of the dynamic sign 14 may be altered to acknowledge the presence of at least one road user 16. In some examples, the dynamic sign may comprise an avatar 26 with a dynamic element. For example, an avatar that may comprise a face.

Additionally or alternatively the dynamic sign 14 may comprise multiple dynamic elements 24 such as a face and a hand. The appearance of a dynamic element may be modified in response to detection of one or more road users 16 to acknowledge the presence of the one or more road users 16. In some examples, a face and/or hand may be animated in response to detection of the one or more road users 16, for example the face may be animated to move and/or the hand may be animated to wave or point.

Additionally or alternatively the dynamic sign 14 may be modified to display one or more additional elements in response to detection of at least one road user 16. For example, the hand may be displayed in response to detection and no longer displayed after acknowledgement of the one or more road users 16.

In some examples, the dynamic sign acknowledges the presence of at least one road user 16 by notifying the at least one road user 16 that the autonomous or semi-autonomous vehicle 12 has detected the at least one road user 16.

The dynamic sign 14 may be configured to notify the at least one road user that the autonomous or semi-autonomous vehicle 12 has detected the at least one road user 16 by visually presenting information to the at least one road user 16.

In some examples, the notification may comprise a response from the one or more road users 16. For example the one or more road users may perform a gesture, such as a wave or a nod, in response to the dynamic sign 14 to indicate that the at least one road user 16 has seen the dynamic sign 14. The response may be detected by the one or more sensors 42 and/or the one or more radio transceivers 40 and processed by the apparatus 30 to provide confirmation to the autonomous or semi-autonomous vehicle that the at least one road user 16 has seen the dynamic sign 14.

Additionally or alternatively the at least one road user may provide a response using a device of the road user 16, such as a mobile or wearable device. For example, the at least one road user may use a device to transmit a signal to the autonomous or semi-autonomous vehicle informing the autonomous or semi-autonomous vehicle that the at least one road user has seen the dynamic sign 14. The signal may be received by the one or more sensors 42 and/or the one or more radio transceivers 40.

In some examples, the dynamic sign 16 is configured to acknowledge the presence of at least one road user 16 by notifying at least one further road user 18 that the autonomous or semi-autonomous vehicle 12 has detected the at least one road user 16. For example, the dynamic sign 14 may notify a pedestrian that the autonomous or semi-autonomous vehicle 12 has detected a vehicle.

In some examples, the dynamic sign 14 may be configured to warn at least one further road user 18 of the presence of the at least one road user 16. For example, the dynamic sign 14 may warn the pedestrian of the presence of the vehicle.

As used herein, the dynamic sign 14 is dynamic as it may be controlled to change over time. For example, in examples where the dynamic sign 14 comprises an avatar 26 the appearance of the avatar 26 may be altered to acknowledge the presence of at least one road user 16.

The term road user is intended to include any entities that use or may use roads or other areas that the autonomous or semi-autonomous vehicle 12 may traverse. For example, road users may include, but is not limited to, pedestrians, cyclists, motorcyclists, vehicles and their drivers and so on. In addition, the term road user is not intended to be limited to entities that use a road and also includes, but is not limited to, other entities such as off-road vehicles and their drivers and so on.

In some examples, the dynamic sign 14 may be a detection acknowledgment that notifies a road user 16 that the autonomous or semi-autonomous vehicle 12 has detected the road user 16 but does not provide a warning to the road user 16.

The dynamic sign 14 may be considered a processing indicator as it notifies a road user that the autonomous or semi-autonomous vehicle 12 has received and processed one or more signals in relation to the road user and has detected the presence of the road user. For example the one or more signals may be received via the one or more sensors 42 and/or one or more radio frequency transceivers 40.

One or more blocks of FIG. 4 may be omitted. In some examples, block 52 might be omitted. For example, the at least one signal received at block 54 may be received, in some examples, without transmission of at least one signal.

FIGS. 5A and 5B illustrate an example of operation of an autonomous or semi-autonomous vehicle 12. The autonomous or semi-autonomous vehicle 12 comprises an apparatus 60 as illustrated in FIG. 2 and described above.

In the example of FIG. 5A an autonomous or semi-autonomous vehicle 12 is driving on an empty road. In the example, the autonomous or semi-autonomous vehicle 12 is continuously scanning its surroundings with the one or more sensors 42 and/or one or more radio frequency transceivers 40.

In the illustrated example, a dynamic sign 14 is displayed on the one or more displays 28 of the autonomous or semi-autonomous vehicle 12. In the example of FIG. 5A the dynamic sign 14 is displayed on the front of the autonomous or semi-autonomous vehicle 12, for example the front screen. The dynamic sign 14 is externally projected. That is, the dynamic sign 14 is visible from outside the autonomous or semi-autonomous vehicle 12.

It may be beneficial to display the dynamic sign on the front screen of the autonomous or semi-autonomous vehicle 12 as other road users may assume this to be the position of a human driver even if there is no human positioned there. This may represent a natural place for other road users to communicate with a driver of a vehicle by, for example, establishing eye contact with the driver.

In the example of FIG. 5A the dynamic sign 14 comprises an avatar 26 which in this example is a generic human face. In other examples, the dynamic sign 14 may have a different appearance. For example, the avatar may look differently than illustrated in the example and may, for example, comprise more or less of a face and/or may comprise additional dynamic elements.

An avatar may be a visualization of at least part of a person, for example a driver of the autonomous or semi-autonomous vehicle 12. In some examples an avatar may comprise the top part of a body and a head and face to visually represent a driver positioned in the autonomous or semi-autonomous vehicle 12. In other examples an avatar may not comprise a body and may comprise, for example, a head and face.

In other examples an avatar may not comprise a whole head and may comprise, for example, a face. In other examples an avatar may not comprise a whole face and may comprise, for example, eyes and/or a nose and/or a mouth.

In general, any suitable dynamic sign 14 for conveying information to road users may be used.

In examples the dynamic sign 14 may be displayed in a first state. In FIG. 5A the avatar 26 is displayed with a neutral appearance. That is, the avatar 26 is displayed in a state in which it is not acknowledging the presence of a road user 16. In examples the avatar 26 is displayed in a first color and/or with a first appearance indicating the neutral state. For example, the avatar may be displayed with face and/or eyes in grey color indicating the neutral state.

In the example of FIG. 5B a road user 16, which in this example is a cyclist 16, is approaching the autonomous or semi-autonomous vehicle 12 from the front.

The presence of the cyclist 16 is detected by the autonomous or semi-autonomous vehicle 12 using the one or more sensors 42 and/or the one or more radio frequency transceivers 40. In response to the detection of the road user 16 the dynamic sign is displayed in a second state. For example, the appearance and/or color of the dynamic sign 14 is altered to notify the cyclist 16 that the autonomous or semi-autonomous vehicle 12 has detected the cyclist 16.

In some examples the dynamic sign 14 may be static in the first and/or second state and may be animated in the first and/or second state. For example, the dynamic sign may be static in the first state and animated in the second state or the other way around.

In some examples the dynamic sign may be animated in a first way in the first state and animated in a second, different way in the second state. For example, an avatar may be animated as looking around in the first state and may be animated to turn and look in a particular direction in the second state.

In the example of FIG. 5B, the appearance of the eyes of the avatar 26 is altered to notify the road user 16 that it has been detected. In this example the eyes of the avatar 26 are depicted as wearing green glasses to notify the road user 16 that he has been detected by the autonomous or semi-autonomous vehicle 12.

In general, any alteration and/or animation of the dynamic sign may be used to intuitively notify the road user 16 that the road user 16 has been detected by the autonomous or semi-autonomous vehicle 12.

For example, the eyes of the avatar 26 may not be altered to display green glasses but may be turned green without the appearance of glasses. In other examples, the appearance of some or all of the dynamic sign 14, such as the avatar 26, may be changed in color to notify the road user 16 that the road user 16 has been detected.

The dotted arrows of FIG. 5B illustrate the cyclist 16 seeing the dynamic sign acknowledging the presence of the cyclist 16.

In the example of FIG. 5B there is no change in operation of the autonomous or semi-autonomous vehicle 12 when the dynamic sign 14 acknowledging the presence of the road user 16 is displayed. That is, the display of the dynamic sign 14 acknowledging the presence of the road user 16 may not be linked to operation of the autonomous or semi-autonomous vehicle 12 such as braking, accelerating and/or changing direction of the autonomous or semi-autonomous vehicle 12.

In this example, the autonomous or semi-autonomous vehicle 12 continues with its operation, driving along the road, and displays the avatar 26 to acknowledge the presence of the cyclist 16.

The display of the dynamic sign 14 acknowledging the presence of at least one road user 16 enables interaction between an autonomous or semi-autonomous vehicle 12 and other road users 16. This provides for safer operation of the autonomous or semi-autonomous vehicle 12 as it allows other road users 16 to be aware of whether they have been detected by the autonomous or semi-autonomous vehicle 12.

Furthermore, the dynamic sign 14 can bridge the gap in interaction between autonomous or semi-autonomous vehicles 12 and people which may make interactions between autonomous or semi-autonomous vehicles 12 and other road users smoother and safer.

The use of an avatar 26 as a dynamic sign 14 is easy to understand and allows other road users to intuitively understand the dynamic sign 14 used by the autonomous or semi-autonomous vehicle.

As previously mentioned, the dynamic sign 14 in FIG. 5B may be considered a processing indicator.

FIG. 6 illustrates an example of operation of an autonomous or semi-autonomous vehicle 12. The autonomous or semi-autonomous vehicle 12 comprises an apparatus 60 as illustrated in FIG. 2 and described above.

The example of FIG. 6 is similar to the example of FIG. 5. In the example of FIG. 6 a dynamic sign 14 in the form of an avatar 26 is displayed on the front screen of the autonomous or semi-autonomous vehicle 12 acknowledging the presence of the road user 16. In the example of FIG. 6 the road user is again a cyclist.

The dynamic sign 14 may be controlled to comprise at least one symbol 22 representing the road user 16 the presence of which is being acknowledged. In some examples the dynamic sign 14 acknowledging the road user 16 may comprise the at least one symbol 22.

In the example of FIG. 6 the dynamic sign comprises a symbol 22 representing the road user 16 the presence of which is being acknowledged.

In some examples the dynamic sign 14 may acknowledge the presence of a road user and subsequently be controlled to comprise a symbol 22 representing the road user 16. In some examples there may be at least some overlap between the acknowledgement and display of the symbol 22.

In the example of FIG. 6, the eyes of the avatar 26 display a symbol representing a cyclist to acknowledge the presence of the cyclist 16. This can be seen by the highlighted eyes illustrated in FIG. 6.

In examples, the autonomous or semi-autonomous vehicle 12 may detect the nature of the road user 16, such as a cyclist, using information obtained for example using the one or more sensors 42 and/or the one or more radio frequency transceivers 40. In some examples, information of the nature of the road user 16 may be transmitted to the autonomous or semi-autonomous vehicle 12 from a device of the road user 16.

In other examples, the dynamic sign 14 may be replaced by one or more symbols 22 representing the road user the presence of which is being acknowledged. In the example of FIG. 6, the avatar 26 may be replaced by a bike symbol 22 to acknowledge the presence of the road user 16 and then the avatar 26 may again be displayed.

In other examples, the dynamic sign 14 may at least partially correspond to a property of a detected road user. For example, the dynamic sign 14 may display a color and/or pattern matching a detected color of the road user 16 or the clothes of the road user 16. This may make it easier for the other road users 16 to identify that they have been detected by the autonomous or semi-autonomous vehicle 12.

In some examples a registration plate of a road user 16 and/or a name of a person, if available, may be shown to make the communication between the autonomous or semi-autonomous vehicle 12 and other road user 16 even more accurate.

This may provide other road users with more certainty that the autonomous or semi-autonomous vehicle 12 is addressing them and therefore provides for safer operation of the autonomous or semi-autonomous vehicle 12.

FIG. 7 illustrates an example of operation of a dynamic sign 14.

In examples, the dynamic sign 14 may be configured to provide, to a road user, a directional indication associated with the acknowledgement. For example, the dynamic sign may be configured to provide to a road user an indication identifying a road user 16. In the example of FIG. 7 the dynamic sign is an avatar 26 and the avatar 26 tilts to the right to indicate that the avatar 26 is identifying a road user 16 in the direction of tilting. In addition/alternatively the dynamic sign 14 may turn to provide a directional indication to a road user 16. In the example of FIG. 7, the avatar 26 may turn to look at the road user 16 being identified instead of or in addition to tilting.

The dynamic sign 14 may warn at least one further road user 18 (see, for example, FIG. 10) of the presence of a road user 16.

In the example of FIG. 7 the avatar 26 is tilting in the direction and the eyes of the avatar 26 have turned red to indicate danger. This has been schematically illustrated by the hatching around the glasses in the example of FIG. 7.

The tilting and/or turning of the avatar 26 in combination with the change in appearance, such as changing color of eyes, may indicate to a road user such as the cyclist 16 that another vehicle is approaching in the indicated direction.

This will be addressed further in relation to FIG. 10.

In general, any indication identifying a road user may be used. For example, any directional indication may be used. In some examples the dynamic sign may be animated and/or the appearance of the dynamic sign may be changed to provide a directional indication. For example, the dynamic sign 14 may change to an arrow pointing in the direction of a road user to identify the road user 16.

In some examples the dynamic sign 14 may change and/or be animated in a first way to indicate potential danger and may change in a second, different way to indicate communication with a road user 16. For example, an avatar 26 may tilt to indicate potential danger in the direction of tilting and may turn to communicate with a road user in the direction the avatar is turned towards.

FIGS. 8A to 8C illustrate an example of operation of an autonomous or semi-autonomous vehicle 12. The autonomous or semi-autonomous vehicle 12 comprises an apparatus 60 as illustrated in FIG. 2 and described above.

In the example of FIG. 8A the autonomous or semi-autonomous vehicle 12 is approaching an intersection or cross roads. Another car 16 is also approaching the intersection from the road at the bottom of the figure and a pedestrian 16 is waiting to cross the road that the autonomous or semi-autonomous vehicle 12 is on. The pedestrian 16 is therefore waiting to cross the route of the autonomous or semi-autonomous vehicle 12.

As can be seen from FIG. 8 the dynamic sign 14 in the form of an avatar 26 is being displayed on the front screen of the autonomous or semi-autonomous vehicle 12. In the example of FIG. 8A the dynamic sign 14 is in the neutral state and the eyes of the avatar 26 are displayed in grey.

In the example of FIG. 8B the autonomous or semi-autonomous vehicle 12 has continued along its route approaching the intersection. In FIG. 8B the dynamic sign 14 is displayed acknowledging the presence of the pedestrian 16. In the example of FIG. 8B the avatar 26 is altered to acknowledge the presence of the pedestrian 16.

In the example the avatar 26 turns towards the pedestrian 16 to provide an indication to identify the pedestrian 16 and the appearance of the avatar 26 altered to acknowledge the presence of the pedestrian 16. For example, the eyes of the avatar may turn to green glasses to notify the pedestrian 16 that the autonomous or semi-autonomous vehicle 12 has detected the pedestrian 16.

The dynamic sign 14 may also be used in a similar way to acknowledge the presence of the car 16 also approaching the intersection. For example, the avatar 26 may tilt and/or turn towards the car 16 and the eyes of the avatar turn green to acknowledge the presence of the car 16.

In some examples, as described in relation to FIG. 6 the dynamic sign 14 may comprise one or more symbols 22 representing the road user 16 the presence of which has been acknowledged. For example, when acknowledging the presence of the pedestrian 16 the eyes of the avatar 26 may show a symbol of a person.

In some examples, the acknowledgement of the pedestrian 16 and the car 16 may occur sequentially one after the other. In other examples, the display 28 may be an autostereoscopic display allowing the dynamic sign 14 to be displayed to the pedestrian 16 and the car 16 simultaneously.

FIG. 8C illustrates an example of a dynamic sign 14 comprising multiple dynamic elements 24. In the example of FIG. 8C the dynamic sign 14 is an avatar 26 acknowledging the presence of the pedestrian 16 by tilting/turning towards the pedestrian 16 and the eyes of the avatar being displayed with green glasses.

In the example of FIG. 8C the autonomous or semi-autonomous vehicle 12 has determined that it has right of way over the pedestrian 16 and is displaying a stop hand gesture to inform the pedestrian 16 that the autonomous or semi-autonomous vehicle 12 will proceed.

In some examples, the dynamic sign 14 may display the multiple dynamic elements sequentially rather than together as in FIG. 8C. For example, the dynamic sign may acknowledge the presence of the pedestrian 16 by turning and/or tilting and changing appearance and then the stop gesture may be displayed.

In general, the dynamic sign 14 might comprise any number of dynamic elements 14 which may take any suitable form. For example, the dynamic sign 14 may comprise multiple elements such as an avatar in combination with different symbols, words, pictures, and/or notifications and so on.

As illustrated by the dotted arrows in FIG. 8C the avatar 26 and the hand gesture is visible to the pedestrian 16.

If the autonomous or semi-autonomous vehicle 12 has the right of way, as in the example of FIG. 8C, but the road user 16 proceeds anyway, the autonomous or semi-autonomous vehicle 12 will stop if possible and the dynamic sign 14 may be altered to notify the road user 16 that they have proceeded incorrectly. For example, the dynamic sign 14 may be changed to include an exclamation mark and/or the avatar 26 may display a frowning face to the pedestrian 16.

In the example of FIG. 8D the dynamic sign 14 acknowledging the presence of the car 16. In this example, the dynamic sign 14 is an avatar 26 and is turned towards the car 16 and the eyes of the avatar 26 have turned to green glasses to acknowledge the presence of the car 16.

The dynamic sign in FIG. 8D also comprises multiple dynamic elements 24. In the example of FIG. 8D the dynamic sign 14 also comprises a hand gesture indicating to the driver of the car 16 that he should proceed. In the illustrated example, this is performed by a hand gesture comprising text and movement. In FIG. 8D the hand moves in the direction of the arrow. In some examples, the dynamic sign 14 may comprise text. For example, in the example of FIG. 8D the dynamic sign 14 may include the word "go".

In some examples, the dynamic sign in FIGS. 8C and 8D may be displayed sequentially. That is, displayed first to the pedestrian 16 and then to the car 16 or vice versa.

In other examples, the display 28 may be an autostereoscopic display and the dynamic sign 14 may be displayed to the pedestrian 16 and the car 16 simultaneously.

In an autostereoscopic display 28 different information may be displayed to different view angles of the display 28.

For example, when the autonomous or semi-autonomous vehicle 12 has detected a road user 16 the dynamic sign 14, such as an avatar 26, may turn and/or tilt to the direction of the detected road user 16 and acknowledge the presence of the detected road user 16 by, for example, the eyes of the avatar 26 turning green. Simultaneously, the dynamic sign 14 may also acknowledge the presence of other detected road users 16 in other directions. For example, the dynamic sign 14 may simultaneously turn towards the other road users 16 from their viewpoint and acknowledge their presence, by, for example, the eyes of an avatar 26 turning green.

Alternatively, the dynamic sign 14 may remain steady but change appearance to the directions where a road user 16 has been detected. For example, the eyes of an avatar 26 may remain neutral, for example grey, in some directions but show green in directions of road users 16 that have been detected by the autonomous or semi-autonomous vehicle 12.

In some examples, the dynamic sign may convey additional information to the road users 16 without the use of additional elements such as the hand gestures of FIGS. 8C and 8D.

For example, in FIG. 8C the eyes of the avatar 26 may first turn green to acknowledge the presence of the pedestrian and then turn red to warn the pedestrian 16 that the autonomous or semi-autonomous vehicle 12 will proceed.

In other examples, the eyes of the avatar 26 in FIG. 8C may only turn red to indicate to the pedestrian 16 that the pedestrian 16 has been detected but to warn the pedestrian that the autonomous or semi-autonomous vehicle 12 will proceed.

FIG. 9 illustrates an example of an autonomous or semi-autonomous vehicle 12 comprising multiple displays 28. The autonomous or semi-autonomous vehicle 12 comprises an apparatus 60 as illustrated in FIG. 2 and described above.

In the example of FIG. 9 the autonomous or semi-autonomous vehicle 12 comprises four displays, one on the front screen, one on the rear screen and one on each side of the autonomous or semi-autonomous vehicle 12. In some examples, the autonomous or semi-autonomous vehicle may comprise more or fewer displays 28.

The processor 34 is configured to control the displays 28 independently of each other. For example, each display 28 may be controlled to display different information independently of the other displays 28.

In the example of FIG. 9 there are four other road users 16, a car 16 to the rear of the autonomous or semi-autonomous vehicle 12, a car 16 to the left of the autonomous or semi-autonomous vehicle 12, a car 16 to the front of the autonomous or semi-autonomous vehicle 12 and a pedestrian 16 to the left and slightly forward of the autonomous or semi-autonomous vehicle 12.

In FIG. 9 the displays 28 on the front, left and rear of the car 16 are displaying a dynamic sign 14, in the form of an avatar 26, acknowledging the presence of the road user 16. The dynamic sign 14 on the right side of the autonomous or semi-autonomous vehicle 12 is displayed in the neutral state.

In some examples, one some or all of the multiple displays 28 may be an autosterescopic display 28. For example, the display on the left of the autonomous or semi-autonomous vehicle 12 may simultaneously display a dynamic sign 14 acknowledging the presence of the car 16 to the left and slightly forward of the autonomous or semi-autonomous vehicle 12 and the pedestrian 16 to the left of the autonomous or semi-autonomous vehicle 12.

Additionally/Alternatively the front display may simultaneously display a dynamic sign 14, such as an avatar 26, acknowledging the presence of the car 16 in front of the autonomous or semi-autonomous vehicle 12 and the pedestrian 16 to the left of the autonomous or semi-autonomous vehicle 12.

In some examples, the dynamic sign 14 displayed on the multiple displays 28 may be different on one some or all of the displays 28.

FIG. 10 illustrates an example of the operation of an autonomous or semi-autonomous vehicle 12. The autonomous or semi-autonomous vehicle 12 comprises an apparatus 60 as illustrated in FIG. 2 and described above.

In the example of FIG. 10 the autonomous or semi-autonomous vehicle 12 is at an intersection or cross roads. In the illustrated example there are three other road users 16, 18. There is a car 16 behind the autonomous or semi-autonomous vehicle 12, a car 16 approaching from behind on the left of the autonomous or semi-autonomous vehicle 12 and a pedestrian 18 crossing in front of the autonomous or semi-autonomous vehicle 12.

In the example of FIG. 10, the autonomous or semi-autonomous vehicle 12 comprises multiple displays as in the example of FIG. 9.

The display on the right of the autonomous or semi-autonomous vehicle 12 is displaying a dynamic sign 14 in a neutral state. The display 28 to the rear of the autonomous or semi-autonomous vehicle 12 is acknowledging the presence of the car 16 behind the autonomous or semi-autonomous vehicle 12. The display 28 on the left of the autonomous or semi-autonomous vehicle 12 is displaying a dynamic sign 14 acknowledging the presence of the car 16 approaching from behind to the left of the autonomous or semi-autonomous vehicle 12 and notifying the car 16 approaching to the left that the autonomous or semi-autonomous vehicle 12 has detected the pedestrian 18.

In this example, the dynamic sign 14 displayed on the display on the left of the autonomous or semi-autonomous vehicle 12 comprises an avatar 26 including multiple dynamic elements and is displaying a hand gesture indicating that the car 16 to the left of the autonomous or semi-autonomous vehicle 12 should stop.

The display 28 on the front of the autonomous or semi-autonomous vehicle 12 is displaying a dynamic sign 14 acknowledging the presence of the pedestrian 18 and is displaying a hand gesture indicating that the pedestrian should proceed.

As the car 16 approaching from behind at the left approaches, the dynamic sign 14 may be configured to notify the at least one further road user 18, which in this case is a pedestrian 18, that the autonomous or semi-autonomous vehicle 12 has detected the road user 16, that is the car 16 approaching from the left.

In some examples, the dynamic sign 14 displayed to the pedestrian 18 may tilt and/or turn towards the direction of the approaching car 16 and change in appearance to notify and/or warn the pedestrian 18 of the presence of the approaching car 16.

For example, as illustrated in FIG. 10 the eyes of the avatar 26 may change to red and display a symbol representing the approaching road user 16. In the illustrated example, the eyes of the avatar 26 display a car symbol 22.

In some examples, the dynamic sign 14 on the left of the autonomous or semi-autonomous vehicle 12 may turn and/or tilt towards the pedestrian 18 and notify the car 16 approaching from behind at the left of the presence of the pedestrian 18.

As described above, the dynamic sign 14 may notify at least one further road user 18 (for example the pedestrian) that the autonomous or semi-autonomous vehicle 12 has detected at least one road user (for example the car approaching the intersection on the left 16).

This increases the safety of the other road users as, for example, in the example of FIG. 10 the pedestrian 18 may not be aware of the car 16 approaching the intersection and may walk out in front of the car 16 causing an accident.

The blocks illustrated in the FIGS. 3 and 4 may represent actions in a method and/or sections of code in the computer program 31. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although examples of the present invention have been described in the preceding paragraphs with reference to various examples, it should be appreciated that modifications to the examples given can be made without departing from the scope of the invention as claimed.

For example, the dynamic sign 14 may identify the autonomous or semi-autonomous vehicle 12 as an autonomous or semi-autonomous vehicle 12.

Any suitable dynamic sign 14 may be used. In the example of an avatar 26 the eyes of the avatar and/or the avatar 26 may blink or flash and/or change in color and/or size.

In examples where hand gestures are not displayed in the dynamic sign the information may be conveyed to other road users 16 using animation and color coding of the dynamic sign 14.

Sounds may also be used. For example the apparatus 60 of FIG. 2 may comprise one or more audio outputs, such as speakers, to allow the autonomous or semi-autonomous vehicle 12 to provide sounds to other road users 16. The processor 34 may be configured to control operation of the audio outputs.

For example, a sound gesture such as "Beware pedestrian, car on the right" may be used in addition to the dynamic sign 14. In some examples a speaker may be directed towards the road user being addressed by the sound gesture.

In some examples the dynamic sign 14 may be displayed anywhere on the autonomous or semi-autonomous vehicle 12 using any suitable means. For example, the dynamic sign 14 may be displayed as a hologram on the roof of the autonomous or semi-autonomous vehicle 12. Additionally/Alternatively the dynamic sign 14 may be displayed on the side of the LIDAR sensor on the roof of the autonomous or semi-autonomous vehicle. The update speed of such a display may be controlled so that the dynamic sign appears steady.

In some examples the surface and/or paint of the autonomous or semi-autonomous vehicle may be used to display one or more dynamic signs 14.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
    causing display, on an autonomous or semi-autonomous vehicle, of a dynamic sign acknowledging the presence of at least one road user that is visible from outside the autonomous or semi-autonomous vehicle, wherein the dynamic sign includes a directional indication associated with the acknowledgement that depends on a direction of at least one road user relative to the autonomous or semi-autonomous vehicle.

2. The method as claimed in claim 1, wherein the dynamic sign is configured to notify the at least one road user that the autonomous or semi-autonomous vehicle has detected the at least one road user.

3. The method as claimed in claim 1, wherein the dynamic sign is configured to notify at least one further road user that the autonomous or semi-autonomous vehicle has detected the at least one road user.

4. The method as claimed in claim 3, wherein the dynamic sign is configured to warn the at least one further road user of the presence of the at least one road user.

5. A non-transitory computer readable medium storing computer program code, that when performed by at least one processor, causes an apparatus to at least:
    causing display, on an autonomous or semi-autonomous vehicle, of a dynamic sign acknowledging the presence of at least one road user that is visible from outside the autonomous or semi-autonomous vehicle, wherein the dynamic sign includes a directional indication associated with the acknowledgement that depends on a direction of at least one road user relative to the autonomous or semi-autonomous vehicle.

6. An apparatus, comprising:
    at least one processor; and
    memory storing computer program code configured to, when performed by the at least one processor, cause the apparatus to at least:
    cause display, on an autonomous or semi-autonomous vehicle, of a dynamic sign acknowledging the presence of at least one road user that is visible from outside the autonomous or semi-autonomous vehicle, wherein the dynamic sign includes a directional indication associated with the acknowledgement that depends on a direction of at least one road user relative to the autonomous or semi-autonomous vehicle.

7. An autonomous or semi-autonomous vehicle comprising the apparatus as claimed in claim 6.

8. The apparatus as claimed in claim 6, wherein the dynamic sign is configured to notify the at least one road user that the autonomous or semi-autonomous vehicle has detected the at least one road user.

9. The apparatus as claimed in claim 6, wherein the dynamic sign is configured to notify at least one further road user that the autonomous or semi-autonomous vehicle has detected the at least one road user.

10. The apparatus as claimed in claim 9, wherein the dynamic sign is configured to warn the at least one further road user of the presence of the at least one road user.

11. The apparatus as claimed in claim 6, wherein the computer program code is configured to, when performed by the at least one processor, cause the apparatus to: control the dynamic sign to comprise at least one symbol representing the at least one road user the presence of which is being acknowledged.

12. The apparatus as claimed in claim 6, wherein the dynamic sign comprises multiple dynamic elements.

13. The apparatus as claimed in claim 6, wherein the dynamic sign comprises an avatar and the appearance of the avatar is altered to acknowledge the presence of the at least one road user.

14. The apparatus as claimed in claim 6, wherein the computer program code is configured to, when performed by the at least one processor, cause the apparatus to: cause detection of the at least one road user.

15. The apparatus as claimed in claim 6, wherein the computer program code is configured to, when performed by the at least one processor, cause the apparatus to: cause display of a dynamic sign to acknowledge the presence of at least one road user to multiple, different road users on a single display on the autonomous or semi-autonomous vehicle.

16. The apparatus as claimed in claim 6, wherein the computer program code is configured to, when performed by the at least one processor, cause the apparatus to: cause display of a dynamic sign to acknowledge the presence of at least one road user on multiple displays on the autonomous or semi-autonomous vehicle.

17. The apparatus as claimed in claim 6, wherein the computer program code is configured to, when performed by the at least one processor, cause the apparatus to: cause simultaneous display of a plurality of dynamic signs acknowledging the presence of a plurality of different road users.

18. The apparatus as claimed in claim 6, wherein the dynamic sign acknowledges the presence of a first road user, and the directional indication depends on a direction of the first road user relative to the autonomous or semi-autonomous vehicle.

19. The apparatus as claimed in claim 6, wherein the dynamic sign acknowledges the presence of a first road user, and the directional indication depends on a direction of a second road user relative to the autonomous or semi-autonomous vehicle, the second road user being different from the first road user.

20. The apparatus as claimed in claim 19, wherein the first road user is a pedestrian and the second road user is a vehicle.

\* \* \* \* \*